C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 1.

Fig. 1.

Inventor:
Charles Marius Motte
per H. W. Plucker
Attorney.

C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 2.

Fig. 1ª

C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 3.

Fig. 2.

Inventor:
Charles Marius Motte
per H. W. Plucker
Attorney.

C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 4.

Fig. 2ª.

Inventor:
Charles Marius Motte
per H. W. Plucker
Attorney.

C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 6.

Fig. 4.

Inventor:
Charles Marius Motte
per H. W. Plucker
Attorney.

C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 7.

Fig. 4.ᵃ

C. M. MOTTE.
TRACTOR COMPRISING A DRIVING AND STEERING WHEEL.
APPLICATION FILED MAY 25, 1918.

1,338,837.

Patented May 4, 1920.
8 SHEETS—SHEET 8.

Inventor:
Charles Marius Motte.
per H. W. Plucker
Attorney.

UNITED STATES PATENT OFFICE.

CHARLES MARIUS MOTTE, OF PARIS, FRANCE.

TRACTOR COMPRISING A DRIVING AND STEERING WHEEL.

1,338,837.  Specification of Letters Patent.  Patented May 4, 1920.

Application filed May 25, 1918. Serial No. 236,634.

*To all whom it may concern:*

Be it known that I, CHARLES MARIUS MOTTE, of No. 53 Avenue Secretan, Paris, France, engineer, have invented Tractors Comprising Driving and Steering Wheels, of which the following is a full, clear, and exact description.

The present invention relates to a tractor which has a driving and steering wheel and is capable of being coupled to any vehicle and in particular to agricultural vehicles and implements.

The said tractor is so designed as to be equally capable of being used as a propeller and as a portable engine for the purpose of actuating any machine or implement.

According to my invention I provide a tractor consisting of a driving and steering wheel of large dimensions mounted on a supporting axle upon which are fixed on the two sides of the wheel the motor and the box containing the change-speed gear and the clutch. The members that transmit motion from the motor to the wheel are located in the supporting axle, and the said wheel is capable of pivoting angularly about the aforesaid axle in such a way as to be capable of acting as a steering wheel.

A frame supports the mechanical unit formed by the wheel, the motor and the change-speed gear box, together with the radiator, the said frame comprising two hollow longitudinal frame members the extremities of which engage the members for coupling the frame to the vehicle or implement to be actuated.

A lower framework carries the driver's seat and is normally supported at the rear by detachable wheels which are removed when the forward end of a vehicle to be actuated is attached thereto.

One constructional form of the invention is illustrated by way of example in the accompanying drawing, in which:—

Fig. 4ᵇ is a view of a detail of construction.

It will be observed from the drawing, that the tractor comprises a driving and steering wheel of large diameter, consisting of a rim or tread circle $a$, united by means of flange rings $b$ to the hub $b'$, which is divided into two parts in a vertical direction. This hub can rotate about two fixed rims $c$ through the medium of steel rollers $c'$ interposed between these rims and the hub.

The wheel is traversed by a hollow axle body $d$, at the extremities $d'$ of which are fixed on one side the casing of a motor $e$ and on the other side a box $f$ containing the change-speed gear and the clutch.

The motion of the motor is transmitted to the wheel by means of a horizontal shaft $g$ carrying at its extremity a coupling cone $h$ which is capable of engaging the flange of a coupling plate $h'$ mounted on a sleeve $i$ which is traversed by the shaft $g$ and about which the pinions $i'$ of various diameters are displaceable.

These pinions engage other spur pinions $i^2$ carried by a shaft $i^3$ parallel to shaft $g$.

One of the pinions $i^2$ is constantly in gear with a spur wheel $j$ carried by a hollow shaft $j'$, to the extremity of which is fixed a bevel pinion $k$. The latter gears with a similar pinion $k'$ mounted on a vertical shaft $k^2$, carrying at its upper part, a pinion $l$ gearing with a toothed rim $l'$ fixed to one of the flange rings $b$ of the wheel.

In the vertical plane of the wheel, the axle body $d$ is provided with two trunnions $m$ and $m'$ rotatably engaged in two sleeves $m^2$ and $m^3$, virtually integral with rims $c$. The shaft $k^2$, which drives the toothed rim $l'$ through the medium of the pinion $l$, extends through the upper trunnion $m$. The lower trunnion $m'$ rests, through the medium of a ball thrust bearing, on a coil spring $n$, the purpose of which is to damp the vibrations and shocks which arise when the machine is traveling along the road or over light, mellow land, in order to protect the driving members.

The driving wheel can receive an angular displacement in a vertical plane by pivoting about the trunnions $m$ and $m'$. This movement is controlled by the lever $o$, which is virtually integral with the trunnion $m'$ and carries at its extremity a toothed sector $o'$ gearing with a spur pinion fixed to the end of the shaft of the steering hand wheel $o^2$.

It will be seen that all the driving members form a compact and balanced unit, and that the transmission members are located inside the hub, in such a way that the driving of the wheel always remains assured in whatever position the latter may be pivoted about its trunnions $m$ and $m'$ for steering purposes.

The wheel arranged in this way is therefore a driving wheel and a steering wheel and it can be made to act as a driving wheel only, by suitably locking the steering lever $o$.

The unit consisting of the wheel, the motor and the gear box is mounted on a frame, in the middle of which the wheel is arranged.

The said frame comprises two hollow longitudinal bearers $p$, engaged and fixed in sockets $p'$ virtually integral with the extremity of the motor and with the gear box. The said longitudinal bearers are united by means of two cross bars $p^2$, upon which are mounted the extremities of a curved metal plate $q$ forming a mud-guard. On this plate is arranged a radiator $q'$, for cooling the circulating water of the motor. The said radiator carries at its upper part the water receptacle $q^2$.

The longitudinal bearers $p$ consist of tubes, or, as shown in the drawing, of channel irons. They are slightly V-shaped, and are open at the ends for the purpose of receiving either the shafts of a vehicle or agricultural or other implement directly, or the coupling rods $r$ of the lower framework which carries the driver's seat. This said lower framework comprises a seat $r'$ for the driver and two detachable wheels $r^2$. With this end in view these wheels are mounted on an axle $r^3$, which may be engaged in two sockets $r^4$ carried by the lower framework and retained in said sockets by means of pins $r^5$ (Figs. 3 and 4).

The coupling rods $r$ of the aforesaid framework are arranged in such a way as to be able to engage in the hollow longitudinal bearers $p$ of the frame of the tractor, as hereinbefore described. These coupling rods are provided with two notches, in which there may engage screw members $s$ carried by shackles $s'$, jointed on to the longitudinal bearers so as to be able to make the latter virtually integral with the said rods.

The tractor constructed in this way may be used for actuating any vehicle or agricultural implement.

Figure 1:
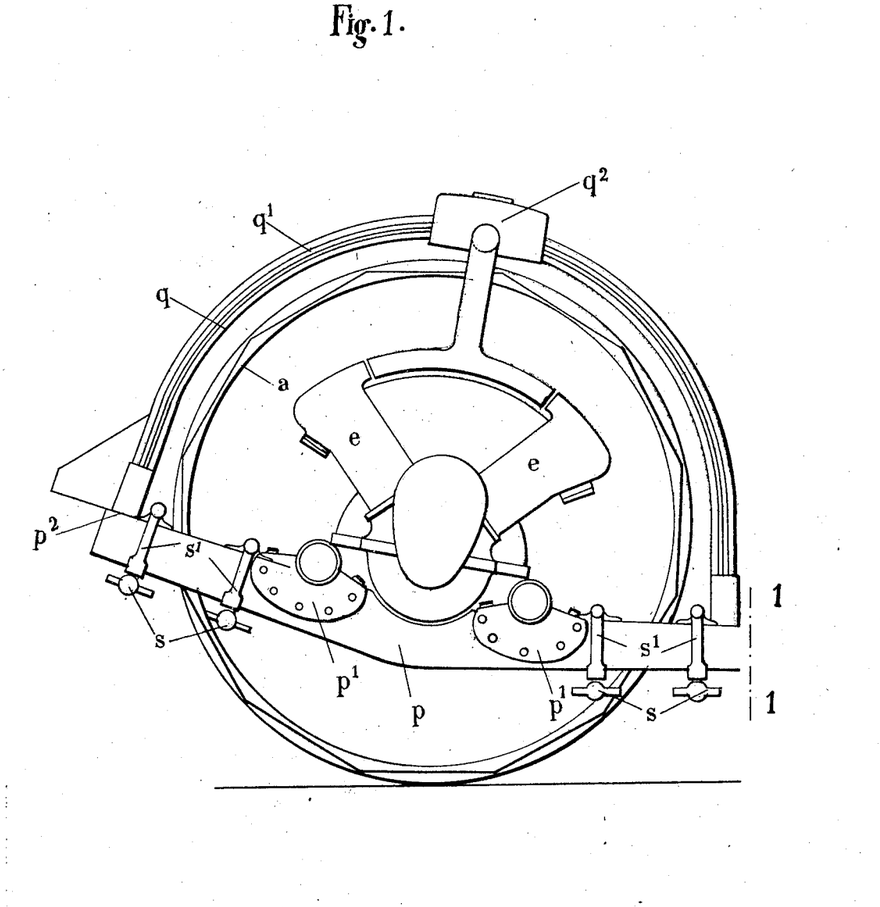
Figures 1 and 1ª show an elevation of the tractor as a whole.
Figure 1A:
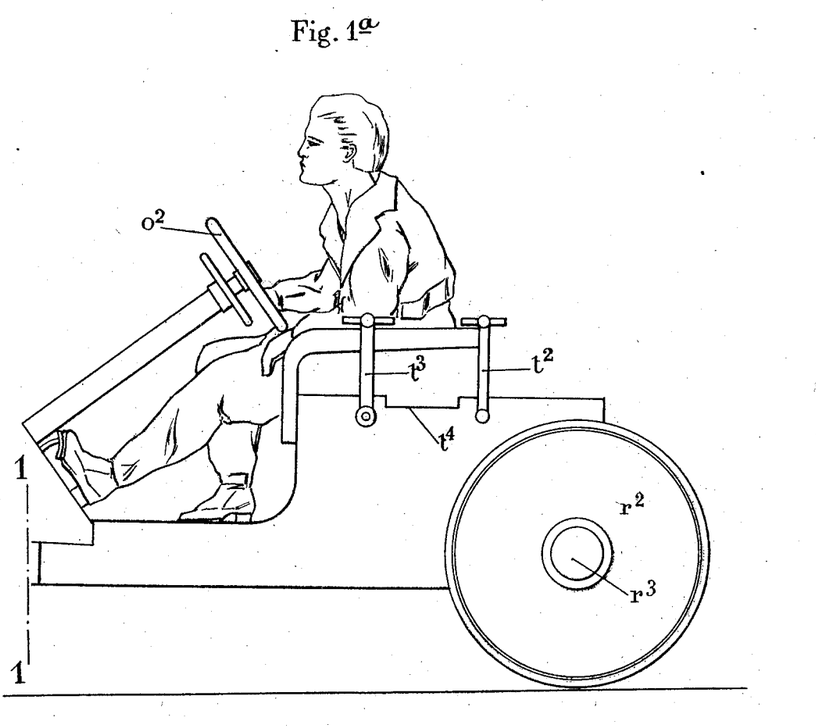
Figure 2:
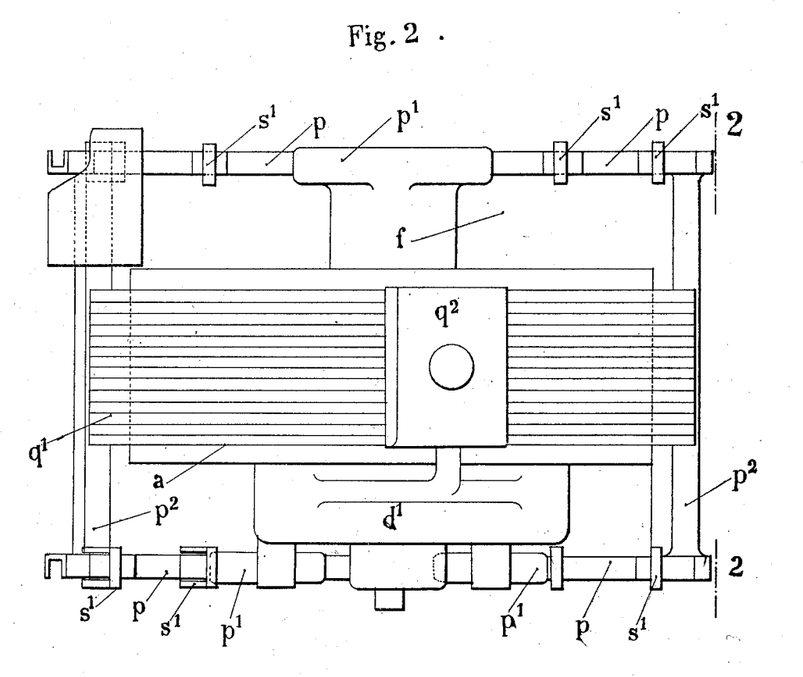
Figs. 2 and 2ª are a corresponding plan, the tractor proper and the lower framework which carries the driver's seat being separated.
Figure 3:
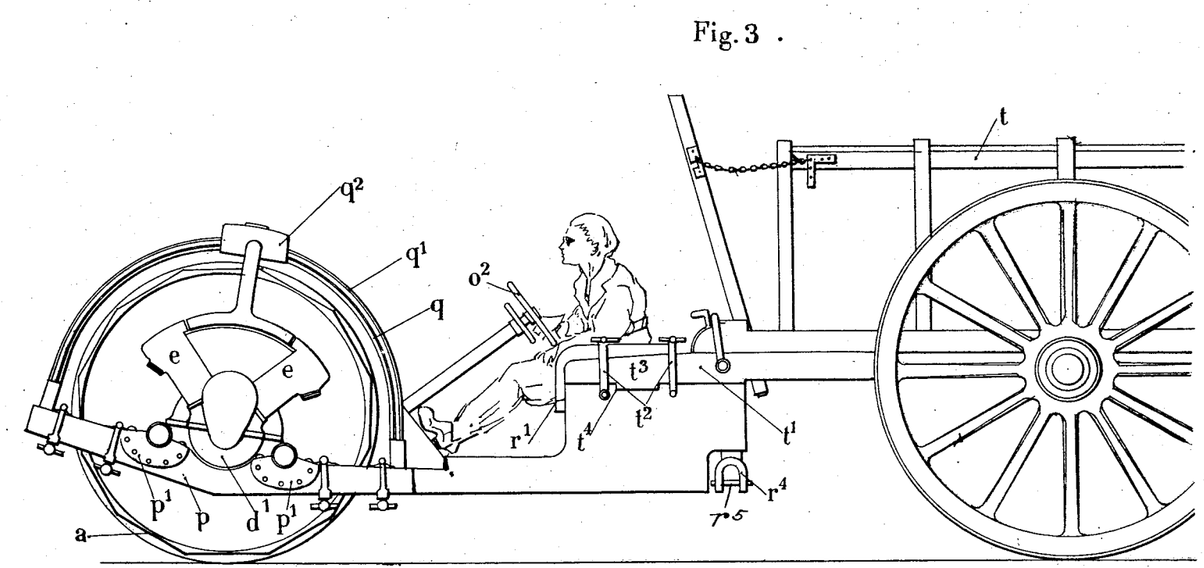
Fig. 3 and Figs. 4 and 4ª are elevations showing the tractor coupled to a vehicle.
Figure 4:
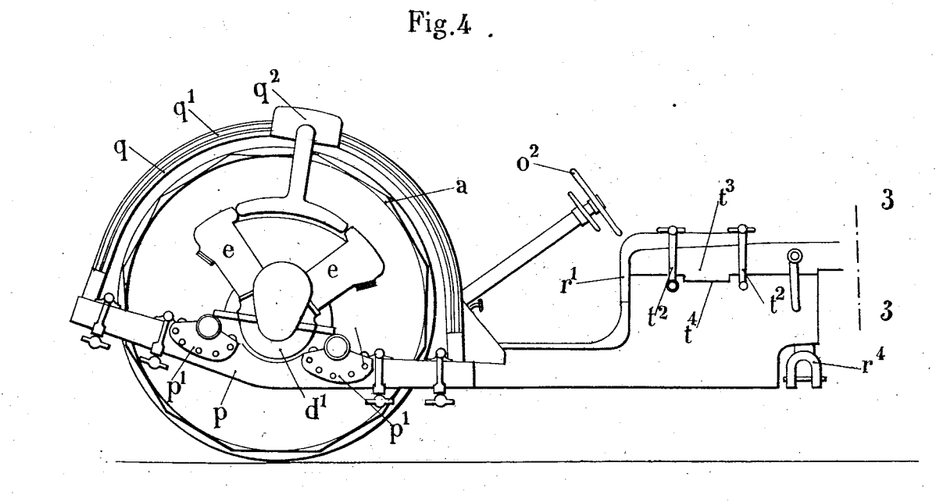
Figure 4A:
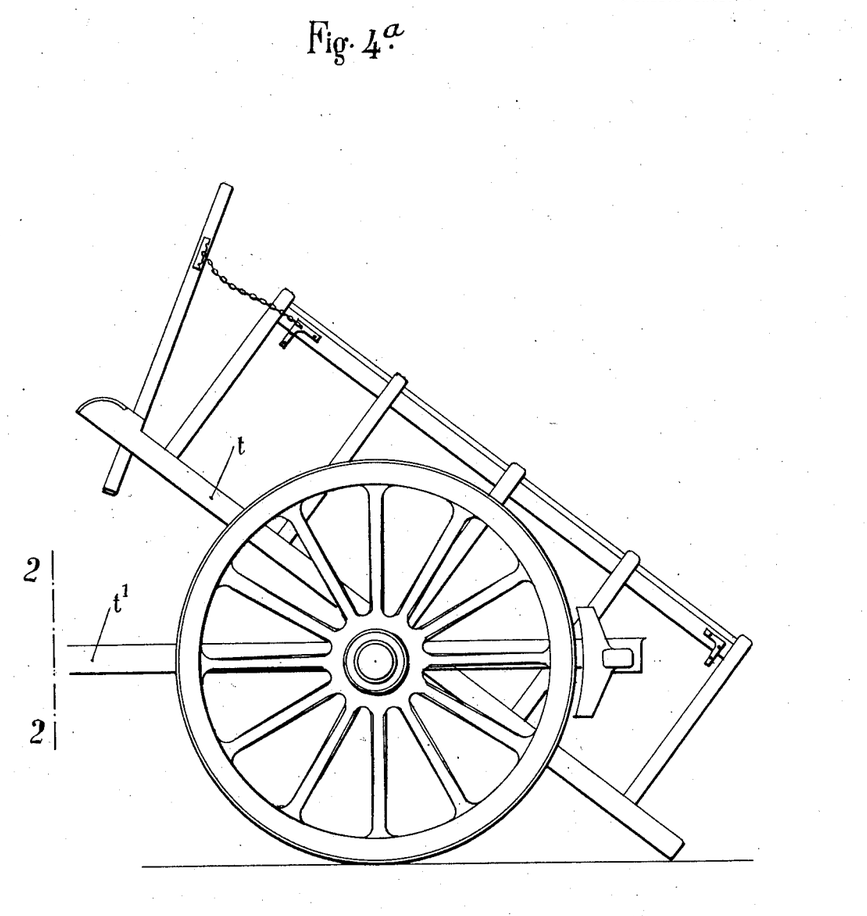
Figure 4B:
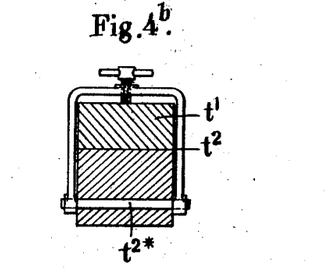
Figure 5:
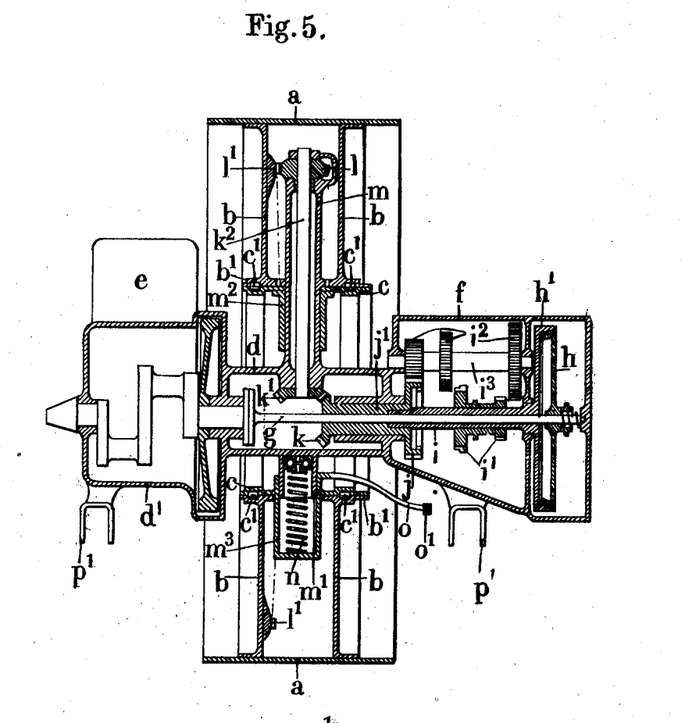
Fig. 5 shows a sectional elevation of the mechanical unit formed by the wheel, the motor and the change-speed gear.

Figs. 3 and 4 show the application of the tractor to a vehicle $t$.

In this case the wheels $r^2$ of the lower framework are removed, the ends of the shafts $t^1$ of the vehicle are engaged on each side of the seat $r'$ of the said frame work and are connected to the latter by means of clamps $t^2$ (see Fig. 4ᵃ) carried by pivot $t^{2*}$ mounted on the aforesaid framework. A projection $t^3$ presented by each shaft, and engaging in a notch $t^4$ formed on the edge of the chariot, insures the connection between the latter and the cart.

Any other vehicle or any agricultural implement may be in this way coupled to the lower frame work of the tractor.

The latter may also be utilized for the purpose of actuating a vehicle or agricultural implement in any manner, the coupling shafts or rods being engaged in the front end of the longitudinal bearers $p$.

The vehicle or agricultural implement may also be coupled directly to the frame of the driving and steering wheel, the driver's seat being in this case carried by the vehicle or implement.

Finally the present tractor may be converted into a portable engine for the purpose of actuating a press, a threshing machine, a pump, or the like, by the application of a pulley driven by the clutch.

The present tractor therefore constitutes a mechanism, capable of furnishing considerable power and of being maintained at small expenditure.

A tractor constructed in the manner hereinbefore set forth will render great services in small agricultural undertakings on account of the small space it takes up, its flexibility, and its adaptability to all kinds of work.

From a mechanical point of view the present tractor is simple and strong and very easy to operate. The driving and steering wheel enables the members that transmit motion to be reduced to a minimum, and the driving device as a whole is rigid.

Furthermore the rim of the wheel is of sufficient breadth to insure stability, which is enhanced by the fact that the center of gravity is placed very low.

The above arrangements are only given by way of example, and the forms, dimensions and devices of detail may be varied according to circumstances without departing in any way from the principle of the invention.

What I claim and desire to secure by Letters Patent of the United States is:—

1. A tractor comprising a driving and steering wheel of large diameter, a hollow supporting axle on which the wheel is mounted, a motor fixed to the axle on one side of the wheel, a casing fixed to the axle on the other side of the wheel, a clutching device and a change speed gear within the casing, and means for transmitting the motion from the motor to the wheel.

2. A tractor comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the axle on the other side of the wheel, a clutching device and a change speed gear within the casing, and means for transmitting the motion from the motor to the wheel.

3. A tractor comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the axle on the other side of the wheel, a clutching device and a change speed gear arranged in said casing, a horizontal shaft actuated by the motor and driving the change speed gear, a shaft arranged in the vertical axis of the wheel and actuated by the said change speed gear, a pinion fixed to said shaft and a toothed rim integral with the wheel and gearing with said pinion.

4. A tractor for vehicles, agricultural implements and the like, comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the other side of the wheel, a clutching device and a change speed gear arranged in said casing, means for transmitting the motion from the motor to the wheel, a frame supporting the axle of the wheel, two hollow bearers for receiving at their ends the coupling members of a vehicle, and a device for supporting the tank for the cooling water of the motor.

5. A tractor for vehicles, agricultural implements and the like, comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the axle on the other side of the wheel, a clutching device and a change speed gear arranged in said casing, means for transmitting the motion from the motor to the wheel, a frame supporting the axle of the wheel, two hollow bearers for receiving at their ends the coupling members of a vehicle, cross bars uniting the hollow bearers, a radiator carried by these cross bars and extending above the wheel, and a tank for the cooling water arranged at the top of the radiator.

6. A tractor for vehicles, agricultural implements and the like, comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the axle on the other side of the wheel, a clutching device and a change speed gear arranged in said casing, means for transmitting the motion from the motor to the wheel, a frame supporting the axle of the wheel, two hollow longitudinal bearers for receiving at their ends the coupling members of a vehicle, a radiator and a tank arranged above the wheel, a carriage with detachable wheels carrying the seat of the driver and capable of being attached to the frame of the tractor, and means for connecting the said carriage to a vehicle.

7. A tractor for vehicles, agricultural implements and the like, comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the axle on the other side of the wheel, a clutching device and a change speed gear arranged in said casing, means for transmitting the motion from the motor to the wheel, a frame supporting the axle of the wheel, two hollow longitudinal bearers for receiving at their ends the coupling members of a vehicle, a radiator and a tank arranged above the wheel, a carriage, wheels detachably mounted thereon, a seat for the driver, coupling rods carried by said carriage fitting in the hollow bearers of the frame of the tractor, recesses provided on the sides of the seat of the carriage for receiving the shafts of a vehicle, and clamps for connecting the rods of the carriage to the tractor and the rods of the vehicle to the carriage.

8. A tractor for vehicles, agricultural implements and the like, comprising a driving and steering wheel of large diameter, a hollow supporting axle on which the wheel is mounted, a rim on which the hub of the wheel can rotate, two pivots integral with the axle, arranged in the vertical axis of the wheel and fitted in said rim, a motor fixed to the axle on one side of the wheel, a casing fixed to the axle on the other side of the wheel, a clutching device and a change speed gear arranged in said casing, means for transmitting the motion from the change speed gear to the wheel, a frame, hollow longitudinal bearers for supporting the axle of the wheel, a carriage connected to the said frame, detachable wheels mounted on said carriage, means for fixing the carriage to the frame and a vehicle to the carriage, a steering hand wheel for steering the apparatus, a shaft carrying said hand wheel, a pinion on the shaft, a lever integral with one of the trunnions of the wheel, and a toothed sector on said lever gearing with the pinion.

This foregoing specification of my "tractor comprising a driving and steering wheel," signed by me this 17th day of April, 1918.

CHARLES MARIUS MOTTE.

Witnesses:
 CHAS. P. PRESSLEY,
 FRANÇOIS WEBER.